Feb. 2, 1926.

J. H. CALDWELL

LAND CLEARING MACHINE

Filed April 15, 1924    2 Sheets-Sheet 1

1,571,704

Inventor
John H. Caldwell
By H.L. & C.L. Reynolds
Attorneys

Feb. 2, 1926.

J. H. CALDWELL

LAND CLEARING MACHINE

Filed April 15, 1924    2 Sheets-Sheet 2

Inventor

John H. Caldwell

By H.L. & C.L. Reynolds

Attorneys

Patented Feb. 2, 1926.

1,571,704

UNITED STATES PATENT OFFICE.

JOHN H. CALDWELL, OF SEATTLE, WASHINGTON.

LAND-CLEARING MACHINE.

Application filed April 15, 1924. Serial No. 706,667.

*To all whom it may concern:*

Be it known that I, JOHN H. CALDWELL, a citizen of the United States of America, and resident of the city of Seattle, in the county of King and State of Washington, have invented certain new and useful Improvements in Land-Clearing Machines, of which the following is a specification.

My invention consists of a machine designed for use in clearing land where certain special conditions exist.

The object of my invention is to produce a machine which will uproot stumps and small trees which are not securely rooted, and will push together said stumps and logs, rubbish and the like, into windrows where it may be conveniently burned.

The invention consists of a self-propelled vehicle of peculiar construction, provided with a series of pushing rams which are mounted so as to be operated by the motor of the apparatus, and are thereby moved in a direction which is transverse to that of the forward progress of the machine, said movement extending substantially down to the ground level so that all logs, rubbish and stumps which extend above the ground level will be engaged thereby and pushed to one side.

The novel features of which my invention consists and upon which I desire to secure a patent will be hereinafter described and particularly pointed out in the claims.

The device illustrated in the accompanying drawings is largely of diagrammatic character, being kept in simple form in order to illustrate merely the principle of the device and its construction.

Figure 1:
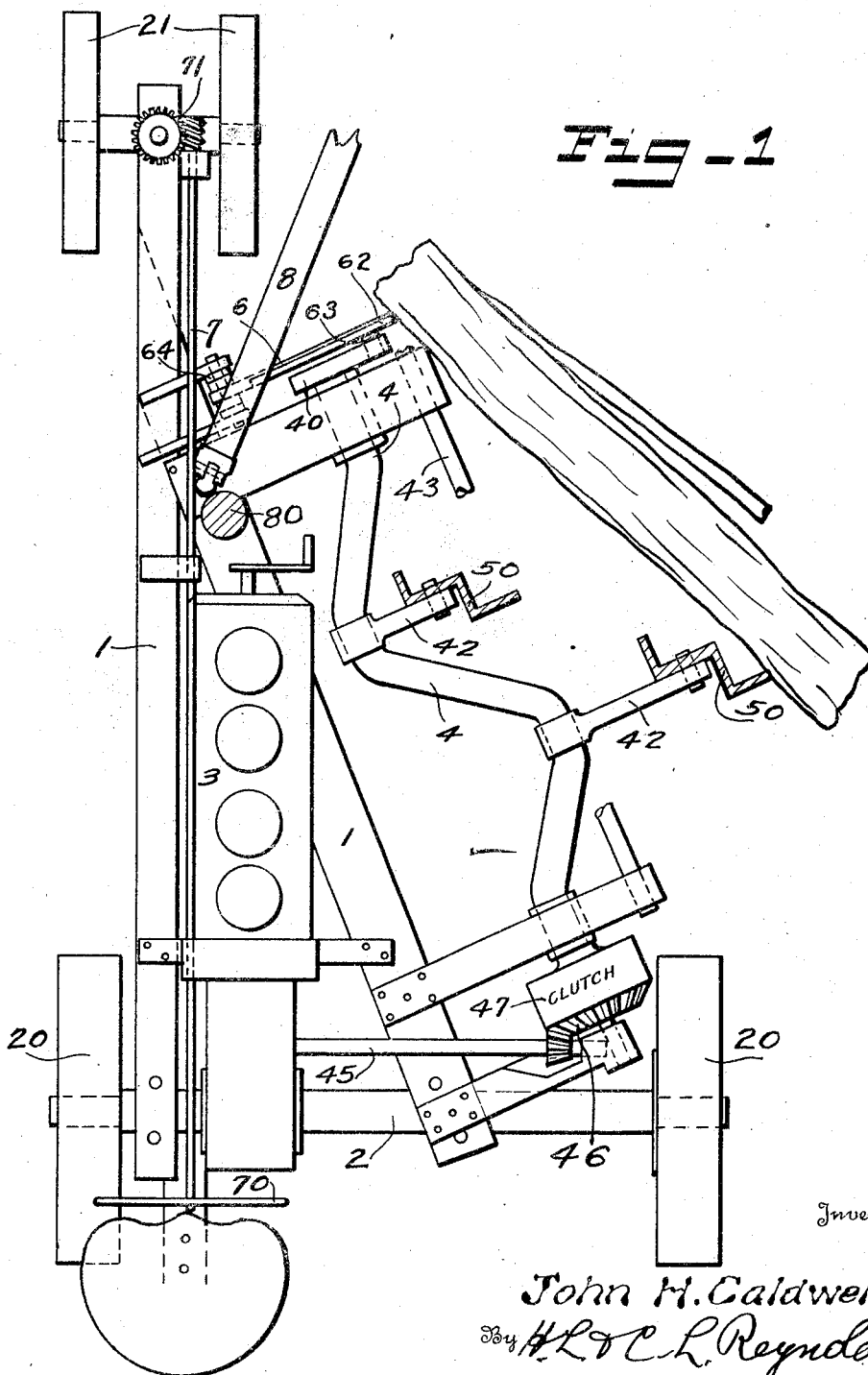
Figure 1 is a plan view of the machine with certain of the upper portions thereof cut away.
Figure 4:
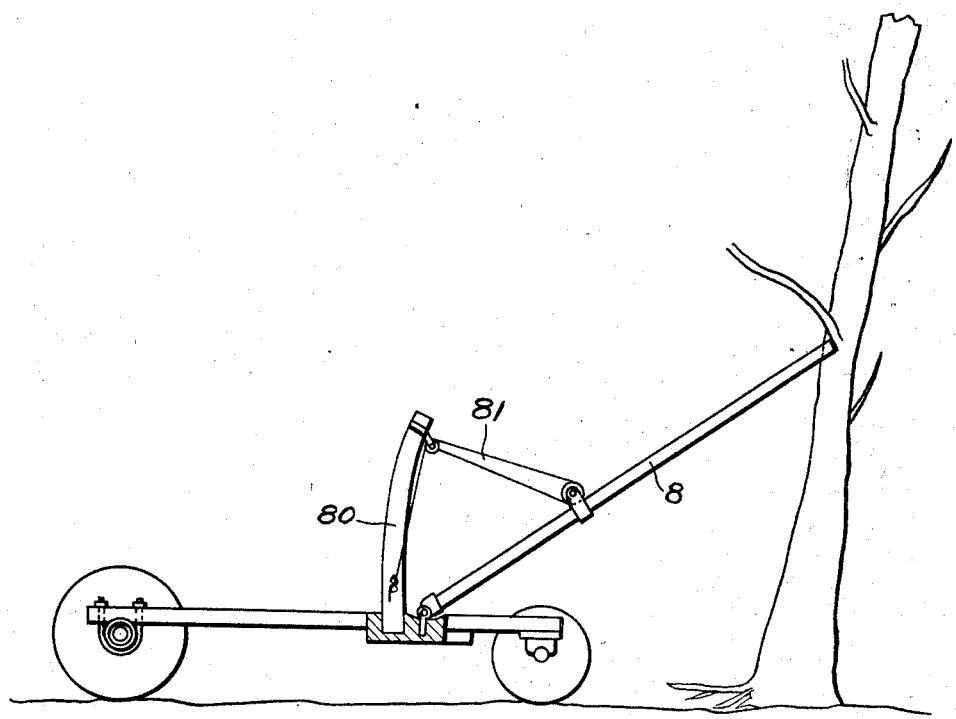
Figure 4 illustrates diagrammatically the manner of using the machine for pushing over small trees.

There are certain areas of the country formerly forested over which there was at the time a heavy growth of moss and other vegetable matter which is of more or less impermanent character. Such sections, after the timber has been cut, is very often swept over by fire which burns away the moss and like covering. Such light vegetable covering is at times of considerable thickness. Where such conditions exist the root growth of the trees has usually been shallow, being largely in the moss and only to a certain extent, and that consisting of the smaller roots, is it imbedded in the solid earth. It is where conditions of this sort exist that my invention is particularly adapted for use.

I provide first a frame work, represented by the beams 1, in which is secured axles and wheels 2 and 20 by which the same may be self-propelled. Usually two driving wheels 20 are employed, these being at the rear end of the machine. At the forward end of the machine a single wheel or a pair of wheels 21 may be employed, but these should be offset to one side of the machine. This provides a triangular frame for the wheels of the machine.

An engine as 3 is mounted upon the frame and connected in any suitable way with the drive wheels so as to propel the machine. A crank shaft 4 is provided, this being located at a moderate elevation on the machine. This is provided with a series of crank pins, corresponding in number with the number of rams which are to be employed. These rams, 6 and 50, are in the nature of heavy bars which may extend either in a horizontal or a vertical direction.

Figure 2:
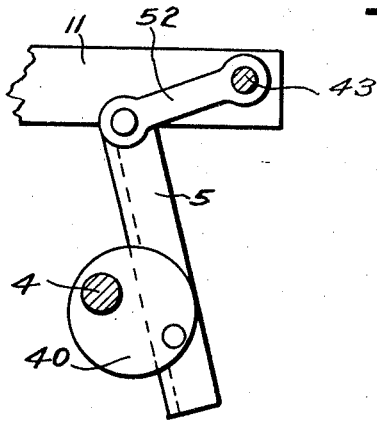
Figures 2 and 3 represent two different manners of connecting the power driven mechanism with the rams to operate them.
Figure 3:
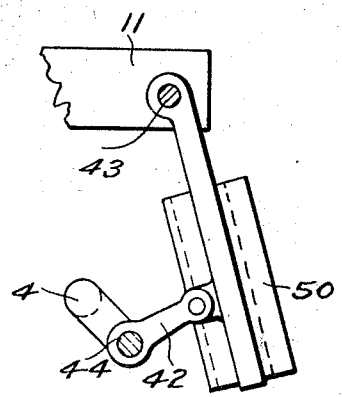

In Figures 2 and 3 vertically positioned rams are shown. The ram 5 of Figure 2 has its upper end pivotally connected by a link 52 to a pivot 43 carried by a frame member 11. The ram is pivoted upon a crank pin carried by a revolving disk 40 which is carried upon a revolving shaft 4.

The ram 50 of Figure 3 has an extension arm pivoted upon a fixed pivot 43 carried by a frame member 11 and is connected by a link 42 with a revolving crank 44 carried by shaft 4.

The shaft 4 may be turned in any manner, as by gearing from the engine through a clutch 47. This method has been shown, a shaft 45 connecting at one end with the shaft 4, through the use of bevel gears as 46. The forward wheel or wheels 21 are mounted upon a vertical axis so that they may be turned for steering. These may be controlled in position, as by means of a shaft 7 containing a steering wheel 70 and connected by worm and pinion 71 with the vertical pivot shaft for the steering wheels.

Whatever the construction of ram, rotation of the shaft 4 will produce a transverse reciprocating or swinging movement of the working end of the ram. If this ram be made of such length that in the lower portion of the side swing thereof it sweeps just over or down to the ground surface, it will strike anything in the way of a log or stump which it meets and will give it a strong lateral blow and push. Under the conditions mentioned the stumps will be easily pushed over. In consequence they will be moved to one side. The successive rams 50, located rearwardly from the ram 5, are or may be of a like or unlike construction.

Each ram after the first, being located farther from the longitudinal axis of the machine than the rams which precede, will sweep over a different portion of the surface. The first ram will uproot and push over the material with which it comes in contact. The second ram will engage this material and such other material as it comes in contact with and push the whole farther outward. The third ram will likewise push the previously uprooted material farther out and uproot such additional material as it comes in contact with. In this way each trip of the machine over the surface will push the material found upon the ground a short distance to one side. The machine will then make another trip over the surface just to one side of the path previously followed, and the material moved by the first trip, together with such new material as is found upon this trip, will be moved over still farther. This process will be repeated so long as the machine is capable of pushing the accumulated material to one side. When this point has been reached a new start will be made and another windrow of material gathered together. After this material has been gathered together, and after it has been given time to dry, if this be necessary, it will be burned.

The cross sectional shape of the engaging ends of the rams I prefer to make of a stepped character, such as has been illustrated in Figure 1. The innermost and forward step of such a ram will engage the material and push it out a certain distance, while the next succeeding step will push it a little farther. While this shape of the ram is a preferred shape, it is appreciated that it need not be of this shape unless desired.

A certain number of trees will be found standing. These in many cases will be dead and may be easily pushed over. For use in such circumstances I have shown a boom, as 8, which is pivotally mounted at its lower end upon the frame of the machine. A standard or mast as 80 is also mounted upon the machine, and a block and tackle with rope, as 81, used, by which the boom may be supported from the mast. When a tree is found standing the upper end of the mast is placed against the tree at as high a point as is deemed feasible, and the tractive power of the machine applied to push the tree over. It is not contemplated that this machine shall be used except where the conditions mentioned exist, namely, the stumps being raised above the ground or otherwise made easy to push over, and surface accumulation of débris which may be gathered together by the peculiar movement of the rams.

What I claim as my invention is:

1. A land clearing device comprising a self-propelled vehicle having a series of rams mounted for recurring movement in directions extending transversely of the direction of movement of the vehicle, and means for applying power to the movement of said rams.

2. A land clearing machine comprising a vehicle, a series of rams mounted in echelon for recurrent movement in directions extending transversely of the direction of movement of the vehicle and just above the ground level, and means for applying power for the movement of said rams.

3. A land clearing machine comprising a vehicle, a series of ram bars mounted for recurring movement in directions transversely of the direction of travel of the machine and with their acting ends just above the ground during their outward movement, and means for applying power to so move said ram bars.

4. A land clearing machine comprising a vehicle, a series of horizontally extending ram bars mounted for recurring movement transversely of the direction of travel of the machine, and with their active ends just above the ground, a power driven shaft extending past the said ram bars and provided with a crank for and connected with each ram bar.

5. A land clearing machine comprising a vehicle, a series of ram bars movable transversely of the direction of progress of the vehicle, pivot supports for one end of each ram bar, the acting ends of the series of said rams being disposed in a line which rearwardly bears outwardly from the direction of travel of the machine, a shaft with cranks extending in the same general direction, and actuating connections between each ram and its respective crank.

Signed at Seattle, King County, Washington this 8th day of April 1924.

JOHN H. CALDWELL.